(12) United States Patent
Abarca Melo et al.

(10) Patent No.: US 9,249,885 B2
(45) Date of Patent: Feb. 2, 2016

(54) MECHANICAL SEAL WITH IMPROVED SEAL ASSEMBLY

(75) Inventors: Ricardo Abarca Melo, Santiago (CL); Rodrigo Guzman Castro, Santiago (CL); Osvaldo Quiroz Venegas, Santiago (CL)

(73) Assignee: Vulco, S. A. (CL)

( * ) Notice: Subject to any disclaimer, the term of this patent is extended or adjusted under 35 U.S.C. 154(b) by 0 days.

(21) Appl. No.: 13/138,663

(22) PCT Filed: Mar. 16, 2010

(86) PCT No.: PCT/AU2010/000307
§ 371 (c)(1),
(2), (4) Date: Nov. 30, 2011

(87) PCT Pub. No.: WO2010/105295
PCT Pub. Date: Sep. 23, 2010

(65) Prior Publication Data
US 2012/0107115 A1    May 3, 2012

(30) Foreign Application Priority Data

Mar. 16, 2009 (CL) .................................. 0629-2009
Mar. 16, 2009 (CL) .................................. 0630-2009

(51) Int. Cl.
| | |
|---|---|
| F04D 29/10 | (2006.01) |
| F16J 15/34 | (2006.01) |
| F04D 29/12 | (2006.01) |
| F16C 17/04 | (2006.01) |
| F16J 15/36 | (2006.01) |
| F16J 15/38 | (2006.01) |

(52) U.S. Cl.
CPC ............. *F16J 15/3448* (2013.01); *F04D 29/12* (2013.01); *F04D 29/126* (2013.01); *F16C 17/04* (2013.01); *F16J 15/3404* (2013.01); *F16J 15/344* (2013.01); *F16J 15/3464* (2013.01); *F16J 15/36* (2013.01); *F16J 15/38* (2013.01)

(58) Field of Classification Search
CPC ............. F01D 25/28; F04D 7/02; F04D 7/04; F04D 29/42; F04D 29/126; F04D 29/601; F04D 29/12; F16C 17/04; F16J 15/344; F16J 15/3452; F16J 15/3464; F16J 15/3448; F16J 15/38; F16J 15/36; F16J 15/3404
USPC ............ 415/231, 206, 213.1, 214.1; 277/371, 277/377–386
See application file for complete search history.

(56) References Cited

U.S. PATENT DOCUMENTS 1,288,542 A    12/1918 Farley
2,785,913 A  *  3/1957 Solari ........................... 277/397
(Continued)

FOREIGN PATENT DOCUMENTS

AU    619522    12/1989
AU    657198    8/1993
(Continued)

*Primary Examiner* — Dwayne J White
*Assistant Examiner* — Jason Fountain
(74) *Attorney, Agent, or Firm* — Morriss O'Bryant Compagni

(57) ABSTRACT

Mechanical seals, seal assemblies and pumps are disclosed. A mechanical seal includes a sealing member and a mount that forms part of a mounting assembly to mount the sealing member to a support structure of the seal. In an embodiment, the mount forms part of a seal assembly and is an elastomeric ring bonded to the sealing member.

20 Claims, 6 Drawing Sheets

(56) References Cited

U.S. PATENT DOCUMENTS

| | | | | |
|---|---|---|---|---|
| 2,839,317 | A | * | 6/1958 | Haake .................... 277/385 |
| 2,888,280 | A | * | 5/1959 | Meyer et al. ............ 277/391 |
| 3,291,493 | A | * | 12/1966 | Blair ...................... 277/381 |
| 3,643,967 | A | | 2/1972 | Stahl |
| 4,111,435 | A | * | 9/1978 | Vilain ..................... 29/252 |
| 4,183,542 | A | | 1/1980 | Quartara |
| 4,411,437 | A | | 10/1983 | Conti |
| 4,418,919 | A | * | 12/1983 | Wentworth ............ 277/371 |
| 4,521,025 | A | | 6/1985 | Leonardsson |
| 4,575,306 | A | | 3/1986 | Monnot |
| 4,703,939 | A | * | 11/1987 | Wentworth ............ 277/372 |
| 4,795,167 | A | | 1/1989 | Otsuka |
| 4,801,244 | A | | 1/1989 | Stahl |
| 5,112,140 | A | | 5/1992 | Cherney |
| 5,114,163 | A | * | 5/1992 | Radosav et al. ........ 277/370 |
| 5,192,085 | A | | 3/1993 | McOnie |
| 5,328,276 | A | | 7/1994 | Linteau |
| 5,490,682 | A | * | 2/1996 | Radosav et al. ........ 277/370 |
| 5,590,966 | A | | 1/1997 | Cherny et al. |
| 5,662,171 | A | | 9/1997 | Brugman et al. |
| 5,772,217 | A | * | 6/1998 | Poll ........................ 277/383 |
| 6,145,841 | A | | 11/2000 | Maeda |
| 6,398,223 | B1 | | 6/2002 | Radosav |
| 6,585,416 | B1 | | 7/2003 | Rimmer |
| 6,637,509 | B2 | | 10/2003 | Farquharson et al. |
| 6,708,980 | B2 | * | 3/2004 | Takahashi .............. 277/380 |
| 7,090,403 | B2 | | 8/2006 | Orlowski et al. |
| 2005/0230923 | A1 | | 10/2005 | Kametaka et al. |
| 2005/0274550 | A1 | | 12/2005 | Yu et al. |
| 2007/0241511 | A1 | | 10/2007 | Kim |
| 2007/0241514 | A1 | | 10/2007 | Orlowski et al. |

FOREIGN PATENT DOCUMENTS

| | | |
|---|---|---|
| CN | 1134525 A | 10/1996 |
| CN | 200982322 Y | 11/2007 |
| CN | 201031809 Y | 3/2008 |
| DE | 3734888 A1 | 4/1989 |
| DE | 3737094 C1 | 5/1989 |
| DE | 4121819 A1 | 2/1993 |
| DE | 10120409 A1 | 11/2002 |
| DE | 102006029678 A1 | 1/2008 |
| EP | 0619145 A2 | 10/1994 |
| GB | 1486541 A | 9/1977 |
| JP | 7217794 A | 8/1995 |
| JP | 7243396 A | 9/1995 |
| JP | 8232657 A | 9/1996 |
| JP | 9287586 A | 11/1997 |
| JP | 10218096 A | 8/1998 |
| JP | 11062890 A | 3/1999 |
| JP | 2002-285995 | 10/2002 |
| JP | 2002-327846 | 11/2002 |
| JP | 2003-97727 | 4/2003 |
| JP | 2004-263585 | 9/2004 |
| JP | 2004-316780 | 11/2004 |
| RU | 2072460 C1 | 1/1997 |
| RU | 4135954 A | 5/2006 |
| SU | 1201599 A1 | 12/1985 |
| SU | 1569482 A1 | 6/1990 |
| SU | 1590781 A1 | 9/1990 |
| SU | 1710901 A1 | 2/1992 |
| SU | 1789806 A1 | 1/1993 |
| SU | 1789809 A1 | 1/1993 |
| WO | WO 80/00366 A | 3/1980 |
| WO | 9500780 | 1/1995 |
| WO | 9807988 | 2/1998 |
| WO | 2004055379 A1 | 7/2004 |
| WO | 2008136757 A1 | 11/2008 |

* cited by examiner

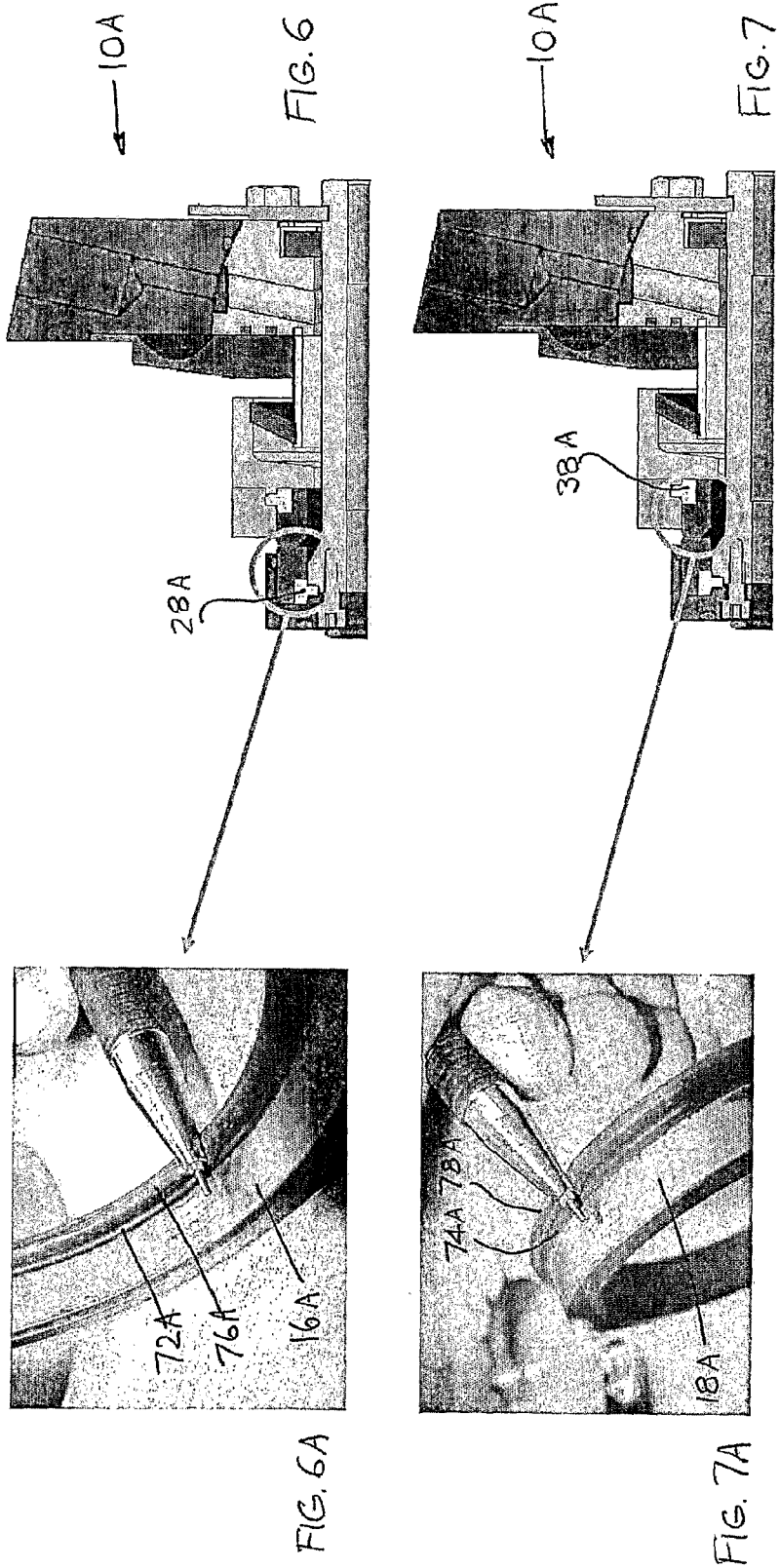

MECHANICAL SEAL WITH IMPROVED SEAL ASSEMBLY

TECHNICAL FIELD

This disclosure relates to a mechanical seal for providing a fluid seal between rotating and stationary components. The invention has been developed especially, but not exclusively for use in fluid pumps, such as slurry pumps, where the mechanical seal is mounted between a rotatable drive shaft and a pump casing and is herein described in that context. However, it is to be appreciated that such a mechanical seal can have broader application and is not limited to that use.

BACKGROUND ART

Mechanical seals have been used to provide a fluid seal between a rotatable shaft and a fluid containing chamber. As such, mechanical seals have application in pumps where the drive shaft of an externally mounted pump motor extends through a pump casing to drive a pump impeller. In such an application, the mechanical seal is typically situated where the rotatable shaft enters or leaves the casing and is fitted to the casing and the rotating shaft to provide a seal between those components.

Such mechanical seals generally comprise some components which rotate with the shaft (or other rotating portion of the equipment to which it is fitted) and those components which are fitted to the stationary parts of the equipment. At the interface between these rotary and stationary components are contacting sealing faces; one which rotates and the other which is stationary. These sealing faces are in opposed relation and arranged to be urged into contact to form a fluid seal therebetween.

In the past, problems have been encountered in using mechanical seals in some pumping applications, particularly in mining slurry pumps because of the harsh environment created in the pumps by the slurry, the high loading induced on the pump components during start up and operation, and the need for continual operation of the pumps over extended periods. Accordingly, there is an ongoing need to improve the design of the mechanical seal to improve its suitability in pumping applications.

SUMMARY OF THE DISCLOSURE

In a first aspect, embodiments are disclosed of a mechanical seal for sealing between a rotatable shaft and a housing, the mechanical seal comprising opposed first and second sealing members each having an annular sealing face surrounding the shaft, the first sealing member adapted to be sealed to the rotatable shaft and the second sealing member adapted to be sealed to the housing, the sealing faces being arranged to be in sliding contact and urged together to form a seal therebetween; and a mounting assembly arranged to secure one of the sealing members in position relative to a support structure of the mechanical seal, the mounting assembly including a mount that is arranged to transfer torque between the support structure and the one sealing member, the mount being arranged to deform under load so as to distribute the torque loading on the one sealing member.

When the mechanical seal is used in a pump, the mount of the mounting assembly assists in protecting the sealing members, particularly in start-up phase of the pump. In starting up, torque imparted by the drive shaft needs to overcome the static frictional resistance that exists at the contacting sealing faces to allow the first (rotatable) sealing member to move relative to the second (stationary) sealing member. This frictional resistance can be high and accordingly the forces induced on the sealing members can be high. The mount enables the one sealing member to better accommodate these forces by allowing the mount to absorb some of the loading by deforming thereby acting as a dampener for the seal. A further advantage of the mount is that it may provide some resilience close to the sealing interface thereby allowing the one sealing member some ability to adjust and move during operation which assists in maintaining those surfaces in contact.

In one form, the mount includes a body portion and a retaining rib that projects from the body portion. In a particular arrangement, the retaining rib is clamped so as to secure the one sealing member in position.

In a second aspect, embodiments are disclosed of a mechanical seal for sealing between a rotatable shaft and a housing, the mechanical seal comprising opposed first and second sealing members each having an annular sealing face surrounding the shaft, the first sealing member adapted to be sealed to the rotatable shaft and the second sealing member adapted to be sealed to the housing, the sealing faces being arranged to be urged into contact to form a seal therebetween; and a mounting assembly arranged to secure one of the sealing members in position relative to a support structure of the mechanical seal, the mounting assembly including a mount having a body secured to the one sealing member and a retaining rib that projects from the body, the retaining rib being clamped to the support structure to allow the transfer of torque between the one sealing member and the support structure.

In one form, according to either aspect described above, the rib projects in a plane that is substantially parallel to the sealing face of the one sealing member.

An advantage of the rib according to the second aspect is that the torque loading is more evenly distributed around the one sealing member because the contact surface is along the clamped rib which may extend about the one sealing member. In previous systems, the torque has been transferred through mechanical fasteners, such as bolts, which cause the stress concentrations in the sealing member at the contacting surfaces between the bolt and the sealing member.

In one form, the mounting assembly further comprising a holding piece which is arranged to releasably clamp the retaining rib to secure the one sealing member into position. Further, in a particular embodiment the mounting assembly further comprises an abutment surface which is arranged to inhibit axial movement of the one sealing member relative to the axis of rotation of the rotatable shaft. In a particular form, the abutment surfaces forms part of the holding piece.

In one form, the one sealing member includes a recess in which the mount is fitted.

In a particular embodiment, the mount is in the form of a resilient ring that is fixed to the one sealing member. In one form, the mount is formed from a viscoelastic material and in a particular embodiment is bonded to the one sealing member. In one form, the mount is bonded by a vulcanising process to the one sealing member.

In a third aspect, embodiments are disclosed of a mechanical seal for sealing between a rotatable shaft and a housing, the mechanical seal comprising opposed first and second sealing members each having an annular sealing face surrounding the shaft, the first sealing member adapted to be sealed to the rotatable portion and the second sealing member adapted to be sealed to the housing, the sealing faces being arranged to be urged into contact to form a seal therebetween; and a mounting assembly arranged to secure one of the sealing members in position relative to a support structure of the mechanical seal, the mounting assembly including a resilient ring that is bonded to the one sealing member and connected to the support structure to allow the transfer of torque between the one sealing member and the support structure.

The ring of the third aspect of the feature may include the features of the resilient ring as described above with respect to the first or second aspects of the disclosure.

In one form in any one of the first, second, or third aspects, the one sealing member is formed from ceramic material. In a particular embodiment the mounting assembly mounts the first sealing member to the rotatable shaft. In this way the mounting assembly is responsible to transfer the torque imparted from the rotary shaft to the first sealing member.

In a particular embodiment the seal comprising a second mounting assembly is arranged to secure the other of the sealing members in position relative to a second support structure of the mechanical seal. This second mounting assembly may include any of the features described above with reference to the mounting assembly of the first, second, or third aspects of the invention.

In a fourth aspect, embodiments are disclosed of a seal assembly for a mechanical seal, the assembly comprising a sealing member having an annular sealing face and a mount which is bonded to the sealing member.

In a particular embodiment, the seal assembly is for use in a mechanical seal according to any form described above with reference to the first, second, or third aspects of the invention. In particular, in one form the mount is formed from a resilient ring bonded to the sealing member. In one form, the mount is formed from a viscoelastic material. In a particular arrangement, the mount is bonded by a vulcanising process to the at least one sealing member. In one form, the mount includes a body portion and a retaining rib that projects from the body portion, the retaining rib being arranged to be clamped so as to secure the sealing member in position in the mechanical seal.

In a further aspect, embodiments are disclosed of a pump including a pump casing having an aperture, a drive shaft that extends through the aperture, and a mechanical seal according to any form described above with reference to the first, second, or third aspects of the invention providing a fluid seal between the casing and the drive shaft, wherein the rotatable shaft of the mechanical seal is mounted to the drive shaft and the housing of the mechanical seal is mounted to the pump casing.

BRIEF DESCRIPTION OF THE DRAWINGS

It is convenient to describe an embodiment of the mechanical seal with reference to the accompanying drawings, in which:

FIG. 6 is a side elevation of the mechanical seal of FIG. 5;

FIG. 6a is a perspective view of a portion of the mechanical seal of FIG. 6;

FIG. 7 is a side elevation of the mechanical seal of FIG. 5; and

FIG. 7a is a perspective view of a portion of the mechanical seal of FIG. 7.

DETAILED DESCRIPTION OF SPECIFIC EMBODIMENTS

Figure 1:
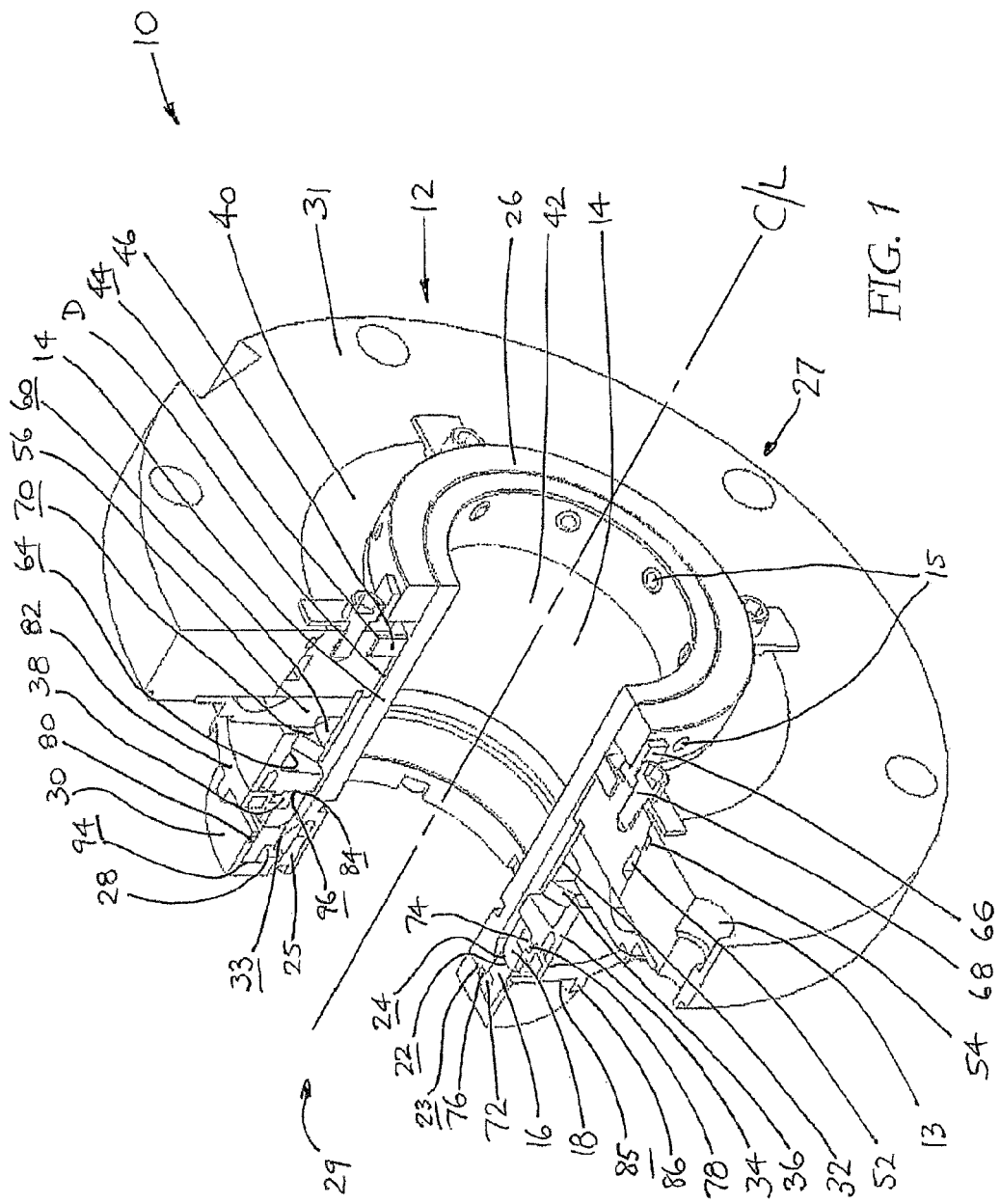
FIG. 1 is a perspective view (with quarter section removed) of a mechanical seal.
Figure 2:
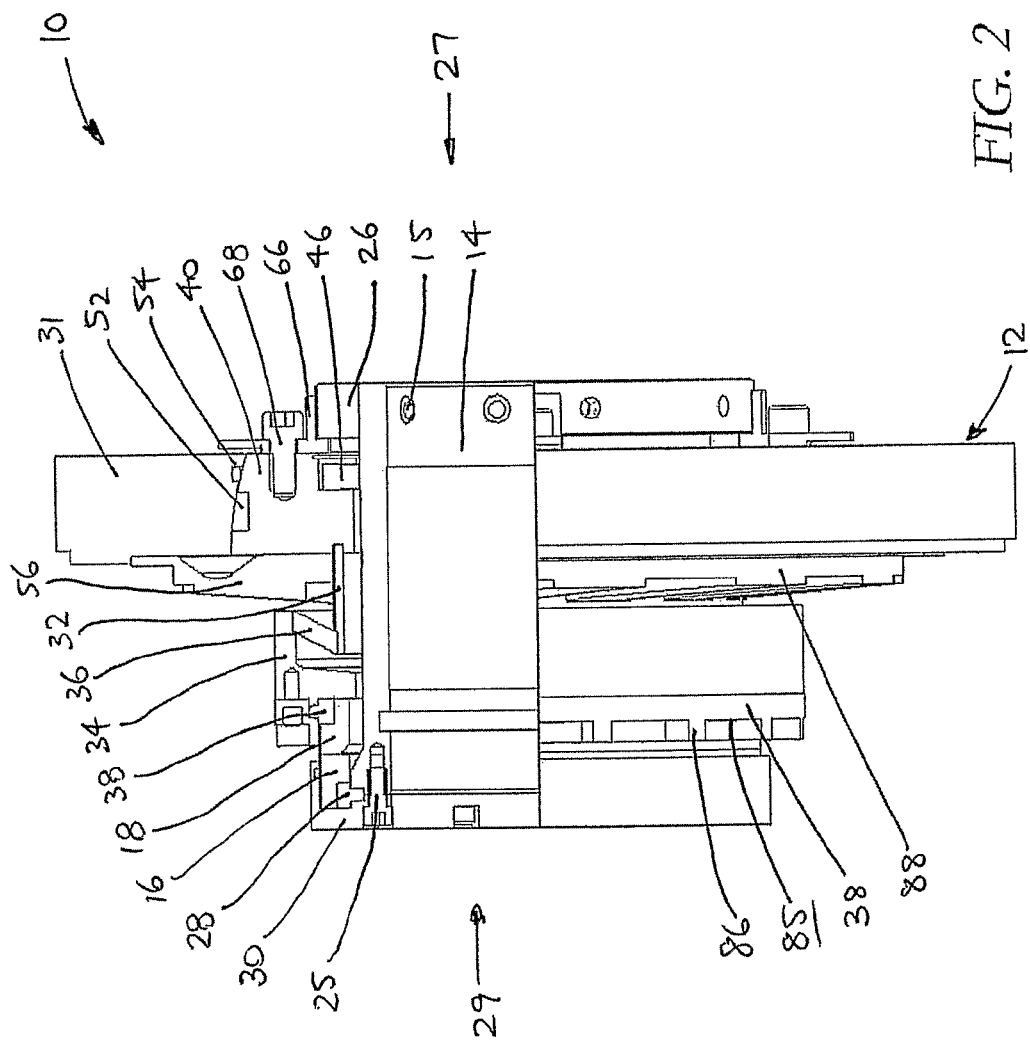
FIG. 2 is a side elevation of the mechanical seal of FIG. 1.
Figure 3:
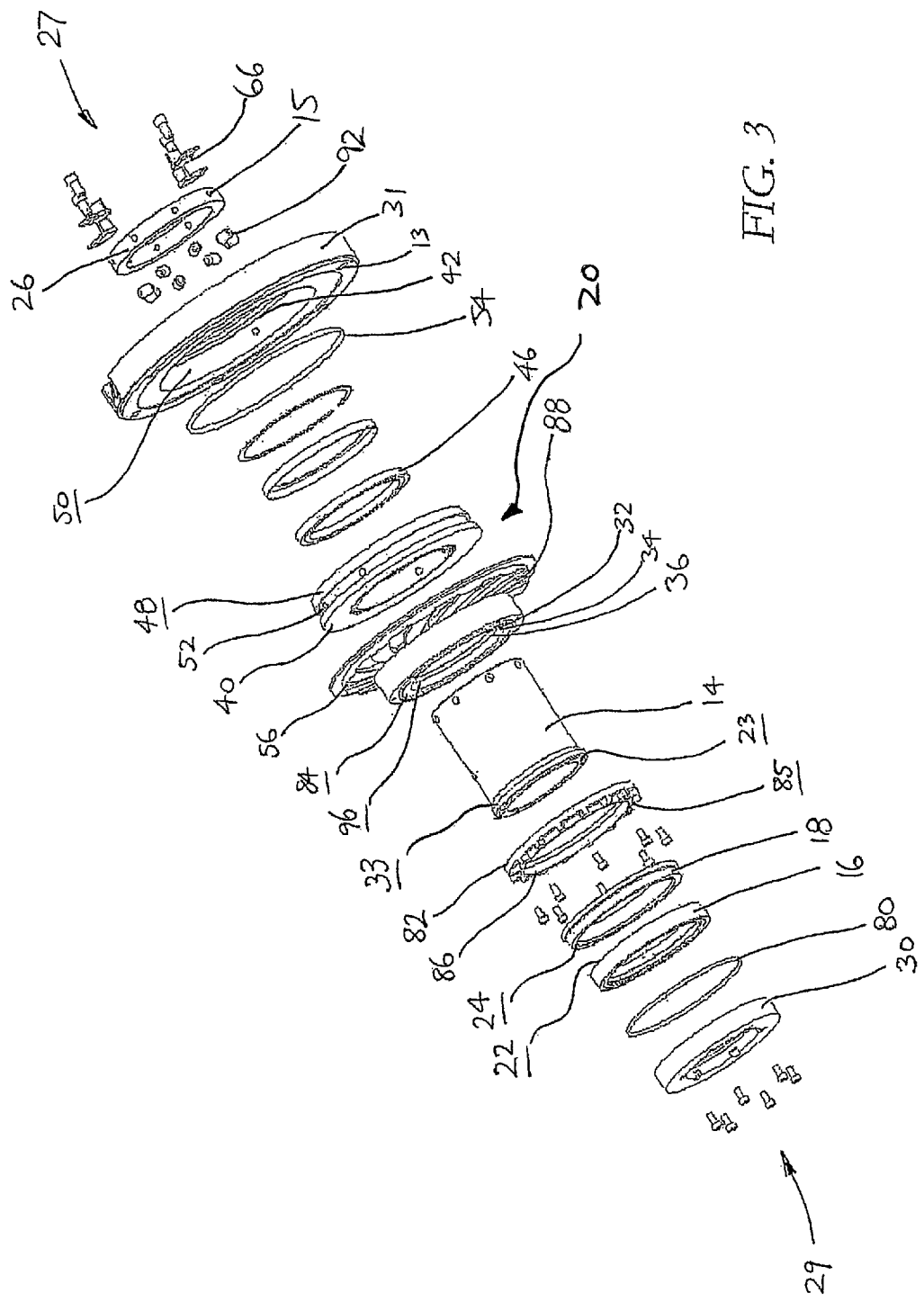
FIG. 3 is an exploded view of the components of the mechanical seal of FIG. 1.

Turning to the drawings, in FIG. 1 a mechanical seal 10 is disclosed which is for use in providing a sealing interface between rotary and stationary components. Broadly, the mechanical seal 10 includes a stationary part or housing 12 in the form of a generally annular-shaped flange or ring 31 and a rotatable part which is generally in the form of a shaft sleeve 14 which extends through the housing 12 and is rotatable about an axis CL. There are various components which connect the rotatable and stationary parts, which will now be described.

To form a fluid seal between the stationary annular flange 31 and the rotatable shaft sleeve 14, a pair of sealing members in the form of continuous rings 16, 18 are provided. In use, the rings 16, 18 are mounted on respective support structures of the seal 10. In the embodiment as shown, one of the sealing rings 16 rotates and is affixed to the shaft sleeve 14, whereas the other sealing ring 18 remains stationary by being fitted to the stationary housing 12 through a support assembly 20 (the various components of which will be described shortly). Each of the sealing rings 16, 18 includes a respective annular sealing face (22, 24) which in use are located in opposing relation and are smoothly finished. The sealing faces 22, 24 are arranged to be urged into contact with one another to form a fluid seal therebetween, as will be described.

Figure 4:
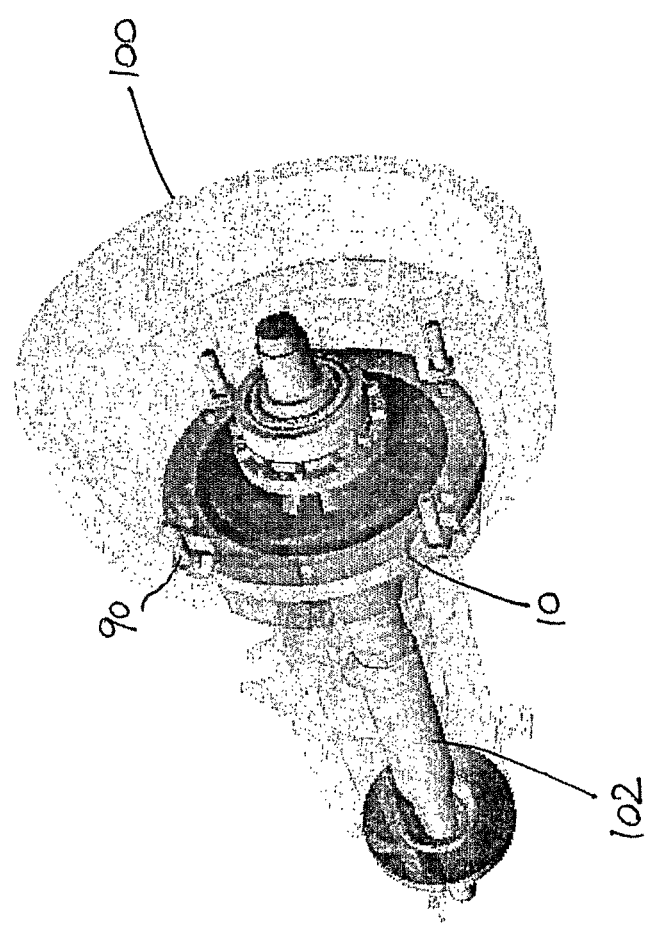
FIG. 4 is a schematic illustration of the mechanical seal of FIG. 1 connected to a pump casing and drive shaft.

The mechanical seal 10 according to the above form is suitable for use in a centrifugal pump (for example, as shown in FIG. 4). The mechanical seal 10 provides a fluid barrier between a pump casing 100 and the rotatable drive shaft 102 which is fitted with a shaft sleeve 14. The shaft sleeve 14 houses (and turns with) the rotatable drive shaft 102, which connects a drive motor (not shown) to a pump impeller (not shown) that is located inside a pumping chamber of the pump. The pump casing 100 is bolted to the housing 12 of the mechanical seal 10 via screws which fit into receiving holes 13. The rotatable drive shaft 102 is fitted by bolts, rivets or screws 92 which are located into receiving holes 15 to fasten it to the rotatable shaft sleeve 14 of the mechanical seal 10.

The rotatable shaft sleeve 14 of the mechanical seal 10 is typically made of a material such as machined stainless steel (for example AISI 316). The shaft sleeve 14 includes a drive collar 26 mounted at a rear end 27 of the shaft sleeve 14, which is on the exterior side of the stationary housing 12 and pump casing 100, and outside of any contact with the fluid inside the pump. The shaft sleeve 14 also incorporates the rotatable sealing ring 16 at an opposite (front) end 29 of the shaft sleeve 14, which is at the region of the mechanical seal 10 which is in contact with the fluid, inside of the pump. The sealing ring 16 is disposed on an outer surface 33 of the shaft sleeve 14 and is oriented so that its respective sealing face 22 faces back towards the rear end 27 of the shaft sleeve 14. The sealing ring 16 (which is typically made from a ceramic such as silicon carbide, or a hard metal material such as tungsten carbide) is coupled to the shaft sleeve 14 via a mounting assembly including a mount in the form an elastomeric coupling 28, and a clamping collar 30 which clamps around the sealing ring 16 and holds it to the shaft sleeve 14 using a screwing arrangement 25. The function and operation of the mounting assembly will be described in more detail below.

The support assembly 20 is located between the shaft sleeve 14 and the housing 12 and is arranged to "float", meaning that it is not rigidly attached to either the housing 12 or to the shaft sleeve 14). The support assembly 20 has multiple functions, being:

- to support the stationary sealing ring 18;
- to provide a biasing force to the sealing ring 18 to urge it into contact with the rotatable sealing ring 16;
- to provide a fluid barrier between the housing 12 and the sealing ring 18. When fitted to a pump, the fluid barrier formed by the support assembly 20 becomes an internal surface of the pump chamber; and
- to support the rotatable shaft sleeve 14 relative to the stationary annular flange 31 forming the housing 12.

To allow for these different functions, the support assembly 20 comprises:

- a base portion in the form of an annular hub 40 that is fitted within the annular flange 31 of the housing 12 and around the shaft sleeve 14 and a circumferential cylinder or sleeve 32 which projects from the hub 40 and extends around, and is spaced from, the shaft sleeve 14;
- a movable portion in the form of a circumferential flanged boss 34; and
- a biasing device in the form of an elastomeric ring 36 disposed between the sleeve 32 and the movable flanged boss 34.

The movable flanged boss 34 has the stationary sealing ring 18 of the mechanical seal fitted at a leading end thereof through a second mounting assembly which includes a second mount in the form of an elastomeric coupling 38. The resilient, elastomeric ring 36 is arranged to impart a biasing force on the moveable flanged boss 34 to urge the sealing ring 18 to move relative to the base circumferential sleeve 32 and into face-to-face close contact with the rotatable sealing ring 16.

The annular flange 31 and the hub 40 are both typically formed from machined steel, such as machined stainless steel (for example AISI 316). The hub 40 includes a central aperture 42 through which the shaft sleeve 14 extends, with a small circumferential clearance distance D thereabout. An inner surface 44 of the hub 40 includes a bearing 46 which extends across the clearance distance D and on which the shaft sleeve 14 rotates. In the illustrated form, the bearing 46 is formed as a carbon slip ring of rectangular cross-section.

The outer circumferential surface 48 of the hub 40 is in sliding contact with an inner circumferential surface 50 of the annular flange 31 of the housing 12, so as to form a joint therebetween. To reduce friction between these surfaces, an annular groove 52 is incorporated in the outer surface 48 of the hub 40. An o-ring seal 54 is also arranged in a small circumferential groove located on the interior surface 50 of the annular flange 31 and positioned between the contacting surfaces 48, 50 to provide a secondary fluid seal therebetween.

An elastomeric boot 56 extends across the front face of the annular flange 31 to partially cover the annular flange 31 and all of the hub 40, including covering over the joint between these components 31, 40 and inhibiting fluid penetration between the inner surface 50 of the annular flange 31 and the outer surface 48 of the hub 40. This boot 56 provides a primary seal against the ingress of fluid and particulate matter on the side of the mechanical seal 10 which is in contact with the fluid inside the pump, but without unduly restricting the sliding nature of the contact between the hub 40 and the annular flange 31.

A feature of the mechanical seal 10 is that the contacting surfaces 48, 50 of the hub 40 and the annular flange 31 are arcuate and more specifically, the hub outer surface 48 is part spherical so as to form a ball joint (or ball-and-socket type joint) between the hub and the annular flange 31 portion of the housing 12. This allows the support assembly 20 and rotary shaft sleeve 14 to "float" and to be tilted relative to the stationary housing 12, so that the axis of rotation of the drive shaft 102 and the shaft sleeve 14 can be moved in all directions away from alignment with the central axis CL of the aperture 42 of the hub 40. In fact, the ball joint which is formed between the hub 40 and the annular flange 31 in the mechanical seal 10 can accommodate a relatively large angular variation between these two axes (in the order of up to 5-10°). This is advantageous since it allows the mechanical seal 10 to be fitted to equipment where the rotatable shaft is out of alignment with the equipment casing which is joined to the annular flange 31 (via screws in receiving holes 13). Furthermore, and importantly, this ability to accommodate this angular variation can be achieved without providing any consequential misalignment of the sealing faces 22, 24 of the respective sealing rings 16, 18, and leakage of fluid therethrough.

The sleeve 32 of the support assembly 20 is supported by, and projects from, the hub 40. The sleeve 32, which is typically formed of steel, such as stainless steel, surrounds but is spaced from the rotatable shaft sleeve 14, and provides a seat for the inner circumference of the elastomeric ring 36. In the illustrated form, the elastomeric ring 36 is formed from a viscoelastic material such as a polymeric elastomer. The ring 36 extends around the outer surface 60 of the sleeve 32 and is bonded to the sleeve 32 preferably by a vulcanizing process so as to form a strong connection that is fluid impervious.

The flanged boss 34 (that connects to the stationary sealing ring 18) is formed as a ring which is L-shaped in cross-section and has an inner surface 64 that fits over, and is bonded on, an outer circumference of the elastomeric ring 36, again preferably by a vulcanizing process to provide both a strong, fluid impervious connection between those elements. The flanged boss 34 is typically formed from metal such as stainless steel and, together with the other parts of the movable portion of the support assembly 20, extends around but is spaced from the rotatable shaft sleeve 14. In this way the flanged boss 34 is fully supported on the elastomeric ring 36.

The resilient, elastomeric ring 36 not only supports the movable portion (flanged boss 34) of the support assembly 20 but is arranged to urge that portion forward (i.e. towards the shaft end 29) so as to maintain the sealing faces 22, 24 of the respective sealing rings 16, 18 in contact. This is achieved by preloading the elastomeric ring 36, by moving/positioning the flanged boss 34 in relation to the sleeve 32 so as to deform the elastomeric ring 36 and place that ring in tension, and then hold those components in that position (that is, the elastomeric ring 36 is placed in tension by movement of the flanged boss 34 rearward towards the rear end 27 of the shaft). This tensioning thereby induces a biasing force on the sealing ring 18 to urge it forward against the outer sealing ring 16 and to maintain a closed gap therebetween. The structure of the elastomeric ring 36 allows the biasing force to be applied uniformly on the sealing ring 18 and about the axis of rotation of the rotatable shaft sleeve 14 and the rotatable sealing ring 16.

The amount of preload applied to the elastomeric ring 36 is dependent on the amount of axial movement of the flanged boss 34 relative to the sleeve 32. As the shaft sleeve 14 is movable relative to the hub 40 (and therefore can be moved axially along the drive shaft 102), this axial movement needs to be constrained to maintain the preload in the elastomeric ring 36. This is achieved by the use of T-shaped setting tabs 66 which are mounted to the hub 40 and removed upon installation of the mechanical seal 10. The setting tabs 66 are typically fixed to the hub 40 by bolts or screws 68 and arranged to anchor about the drive collar 26 to fix the axial position of the hub 40 on the shaft sleeve 14. In the form as illustrated, the setting tabs 66 are arranged to bear against the drive collar 26. With the setting tabs 66 in place, the elastomeric ring 36 remains in its preloaded state as the support assembly 20 can not expand axially along the shaft (which would unload the tension in the elastomeric ring 36) as it is confined axially between the front rotary sealing ring 16 and the drive collar 26 at the rear of the shaft.

The construction of the support assembly 20 with the elastomeric sealing ring 36 disposed between the sleeve 32 and the flanged boss 34 provides an arrangement where the force applied to the stationary sealing ring 18 is concentric and uniform about the axis of rotation CL of the rotatable shaft sleeve 14.

The support assembly 20 provides a fluid barrier for the mechanical seal 10 that extends from the stationary sealing ring 18 to the annular flange 31 of the housing 12, and in effect becomes an internal wall of the pump casing. The sealing ring 36 is thus exposed to the fluid in the pump 100 during operation. The ring 36 forms an integrated part of this fluid impervious barrier (comprising the continuous sealing ring 36 that is bonded to the sleeve 32 and the flanged boss 34 also).

The rear surface 70 of the sealing ring 36 is in contact with the fluid inside the pump because fluid is able to penetrate the space between the end of the flanged boss 34 and the boot 56. This then enables the fluid pressure in the pump to assist in biasing the flanged boss 34 of the support assembly 20 forward in the direction of end 29, thereby contributing to the biasing force which maintains the annular sealing faces 22, 24 in contact. An increase in the fluid pressure within the pump chamber can increase the biasing force. This additional biasing force counteracts, at least to some extent, the force that is applied by the fluid pressure at the joint of the sealing rings 16, 18 which tends to force those members apart. As such the mechanical seal 10 is able to operate effectively under different fluid pressures. This is beneficial in pumping applications where the fluid pressure can fluctuate considerably from start up to being fully operational.

As mentioned above, the sealing rings 16, 18 are each held in place via mounting assemblies. These mounting assemblies include elastomeric couplings 28, 38 which are designed to accommodate torque loading, abutment surfaces 94, 96 against which the sealing rings 16, 18 locate, and which restrain the sealing rings 16, 18 from moving axially, and clamping collars 30, 82 which clamp the respective elastomeric couplings 28, 38. Further, one of the clamping collars 30 includes the abutment surface 94 whereas the other clamping collar 82 is designed to hold the sealing ring 18 against the abutment surface 96.

In the illustrated form, the sealing rings 16, 18 (which are typically ceramic) have a cut-out portion or recess on the rear face (the opposite face to their respective annular sealing faces 22, 24). The elastomeric couplings 28, 38 each have a base portion (72, 74 respectively) that is mounted in that recess and typically bonded in place by a vulcanizing process. The elastomeric couplings 28, 38 also include respective rib portions 76, 78 that extend outwardly from the base portions 72, 74 beyond the respective sealing rings 16, 18 to which they are fitted, and in a plane parallel to the respective annular sealing faces 22, 24. These rib portions 76, 78 are releasably clamped in use, to hold the attached sealing rings 16, 18 in place. Specifically, the rotatable sealing ring 16 is held by a holding piece in the form of the clamping collar 30 clamping the rib portion 76 to the front surface 23 of the shaft sleeve 14. An o-ring 80 may also be fitted to provide a water barrier between the collar 30 and the sealing ring 16. The clamping collar 30 includes the abutment surface 94 on an inner face and bears against the rear face of the sealing ring 16 so as to prevent axial movement of the sealing ring 16 away from the other sealing ring 18. The stationary sealing ring 18 is held by a holding piece in the form of the clamping collar 82 which clamps the rib portion 78 onto the forward surface 85 of the flanged boss 34. Further the sealing ring 18 is clamped in a position where its rear face bears against the abutment surface 96 which is formed on the outer face of the flanged boss 34.

The clamped elastomeric couplings 28, 38 are in the form of resilient rings and designed to accommodate torque and assist in protecting the sealing rings 16, 18, particularly in the start-up phase of use of a pump. In starting up, the torque imparted by the drive shaft 102 needs to overcome the static frictional resistance that exists at the contacting sealing faces 22, 24 to allow the rotatable sealing ring 16 to move relative to the stationary sealing ring 18. This frictional resistance can be high and accordingly the forces induced on the sealing rings 16, 18 can be high. The elastomeric couplings 28, 38 enable the sealing rings 16, 18 to better accommodate these forces by ensuring the torque is transferred and distributed along the sealing rings 16, 18 (because of the continuous contacting surface between the clamping collars 30, 82 and the rib portions 76, 78 of the elastomeric couplings 28, 30) and also by allowing the elastomeric couplings 28, 30 to absorb some of the loading by deformation, thereby acting as a dampener for the mechanical seal 10. A further advantage of an elastomeric coupling 28, 30 is that it provides some resilience close to the sealing interface thereby allowing the sealing rings 16, 18 some ability to adjust and move during operation which assists in maintaining the surfaces of the sealing faces 22, 24 in contact. For the couplings 28, 30 and for any of the other elastomeric parts referred to in this specification, the material of manufacture can be a viscoelastic material such as a polymeric elastomer, or a natural or synthetic rubber or compounded rubber, or a specific rubber product blend (for example, Viton brand). In further embodiments, the elastomeric couplings 28, 30 can be present in the form of multiple, possibly discontinuous, arc-shaped segments fixed to a respective sealing ring 16, 18 rather than in a continuous ring form.

In the illustrated form, the collar 82 has a forward facing surface 84 which incorporates radially extending fins 86. These fins are designed to promote turbulent flow in the vicinity of the sealing rings 16, 18 which assist in cooling the sealing rings 16, 18 by conducting away the frictional heat generated in their general vicinity during use. To further assist in creating this turbulent flow, additional fins 88 are profiled in the front face of the boot 56. It has been found in experimental tests that turbulent flow is sufficient to cool the mechanical seal 10 especially in the vicinity of the sealing rings 16, 18, and without the need for a separate quenching system being incorporated in the mechanical seal 10. This provides considerable advantage both in terms of simplifying the design and reducing the costs of ongoing operation.

In use, the mechanical seal 10 is provided with the biasing device in the form of the elastomeric ring 36, being preloaded. The mechanical seal 10 is fitted to the pump 100 by locating the shaft sleeve 14 on the drive shaft 102 of the pump 100. The annular flange 31 is able to be tilted on the hub 40 of the mechanical seal 10 if required so that the annular flange 31 aligns with the pump casing. The mechanical seal 10 is then secured in place, with the annular flange 31 being bolted to the casing by bolts 90 which are located in receiving holes 13. The shaft sleeve 14 is fitted to the drive shaft 102 by bolts; rivets or screws 92 which extend through receiving holes 15 in the drive collar 26 and which bite into the drive shaft 102. Once fixed in place, the setting tabs 66 can be removed, which ensures that there is adequate running clearance between the drive collar 26 and the hub 40 and that the various components of the support assembly 20 are in appropriate tension and contact. The mechanical seal 10 is now in place and the pump ready for operation.

Figure 5:
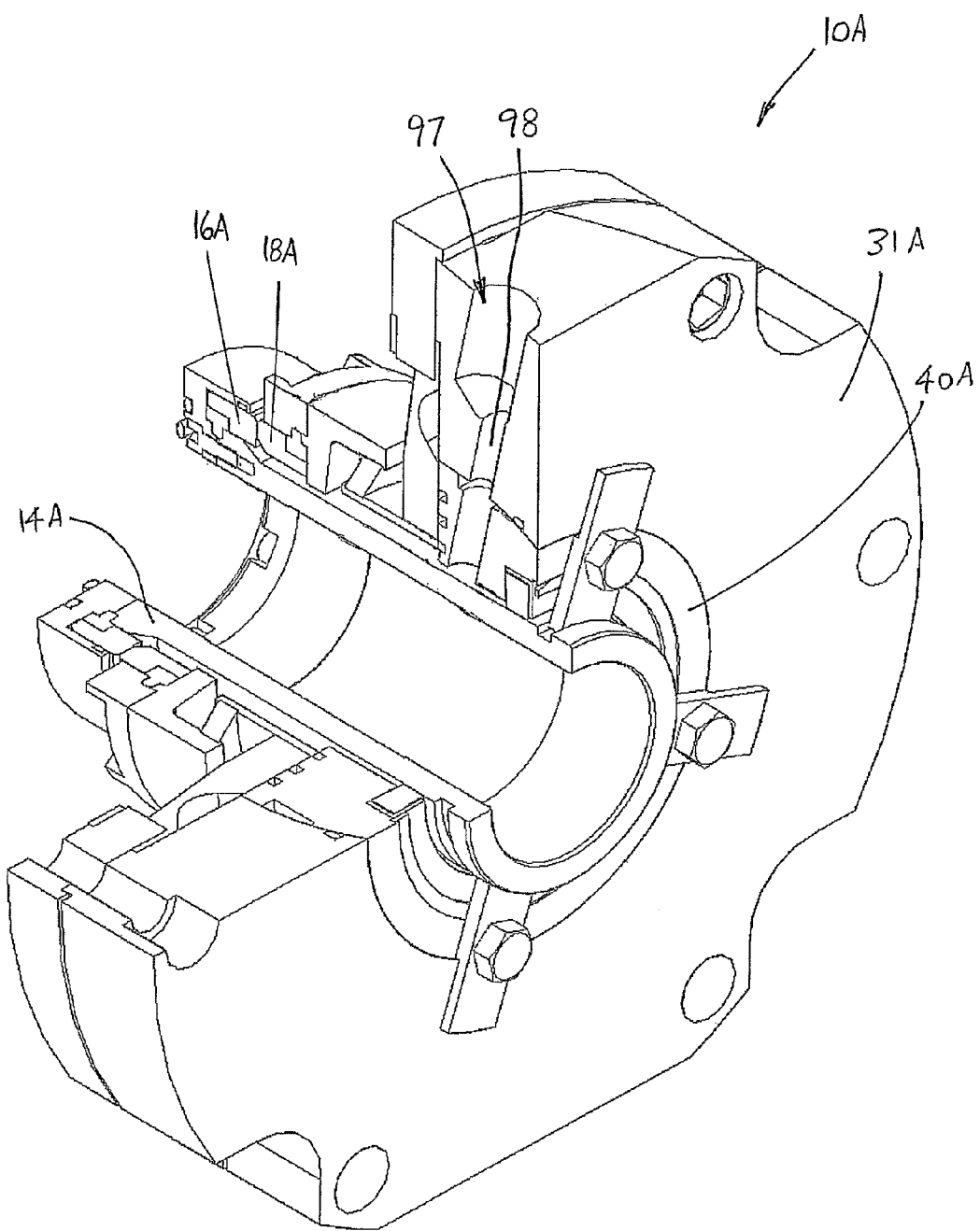
FIG. 5 is a perspective view (with quarter section removed) of another embodiment of a mechanical seal which is similar to the embodiment of FIG. 1.

In a further embodiment shown in FIG. 5, the mechanical seal 10A is in all respects the same as the mechanical seal 10 shown in FIG. 1 to FIG. 4, and for simplicity like parts have been given a similar part number with the additional letter "A". The main difference between the mechanical seals 10, 10A is the presence of a quench system 97 in the mechanical seal 10A. The quench system 97 includes a port 98 that forms an internal conduit which extends through the annular flange 31A of the stationary housing 12A and the hub 40A. The port 98 is arranged for the possible introduction of cooling water into the seal chamber which is located between the shaft sleeve 14 and the various components of the support assembly, as well as the possibility of flushing out any particulate matter which has crept into the seal chamber in use. A second port (not shown) is also provided which forms a similar internal conduit to the port 98 but which is angularly spaced about the axis CL from the port 98 and provides a discharge point for the cooling water introduced into the seal chamber via the port 98.

Referring the FIGS. 6, 6a, 7 and 7a in relation to the mechanical seal 10A, further detail is shown of the elastomeric couplings 28A, 38A. In FIGS. 6 and 6a, the elastomeric coupling 28A is shown in some further perspective detail when bonded to the sealing ring 16A. In FIGS. 7 and 7a, the elastomeric coupling 38A is shown in some further perspective detail when bonded to the sealing ring 18A.

Accordingly, a mechanical seal is provided that is ideally suited for pumps. The seal is of simple construction and is able to operate under fluctuating fluid pressures to provide a uniform biasing force on the sealing faces to maintain those sealing faces in contact. The mechanical seal does not require separate quenching to cool the sealing faces (although this is optionally available in certain embodiments), and it is able be fitted to drive shafts that are out of alignment with the pump casing.

In the claims which follow and in the preceding summary of the invention, except where the context requires otherwise due to express language or necessary implication, the word "comprising" is used in the sense of "including", that is the features specified may be associated with further features in various embodiments of the invention.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Finally, it is to be understood that various alterations, modifications and/or additional may be incorporated into the various constructions and arrangements of parts without departing from the spirit or ambit of the invention.

The invention claimed is:

1. A mechanical seal for sealing between a rotatable shaft defining a longitudinally extending axis and a housing, the mechanical seal comprising:
    opposed first and second sealing members each having an annular sealing face surrounding the shaft, the first sealing member adapted to be sealed to the rotatable shaft and the second sealing member adapted to be sealed to the housing, the sealing faces being arranged to be urged into contact to form a seal therebetween;
    a mounting assembly arranged to secure one of said first sealing member or said second sealing member in position relative to a support structure of the mechanical seal, the mounting assembly including:
        a mount having a body secured to one of said first sealing member or said second sealing member and a retaining rib that projects radially from the body beyond the one of said first sealing member or said second sealing member, the retaining rib having a free end opposite the body that is spaced apart from and not in contact with the one of said first sealing member or said second sealing member;
        a holding piece mounted to the support structure, the free end of the retaining rib being disposed between, and clamped in the direction of the longitudinally extending axis by, the holding piece and the support structure; and
        an abutment surface located on the holding piece or the support structure against which the one of said first sealing member or said second sealing member bears,
    the mounting assembly being configured such that the transfer of torque between the one of said first sealing member or said second sealing member and the support structure is accommodated through the clamped retaining rib, whereas the one of said first sealing member or said second sealing member bears against the abutment surface so as to restrain axial movement of said first sealing member or said second sealing member away from the other of said first sealing member or said second sealing member.

2. A mechanical seal according to claim 1, wherein the mount is arranged to deform under load so as to distribute the torque loading on the one of said first sealing member or said second sealing member.

3. A mechanical seal according to claim 1, wherein the rib projects in a plane that is substantially parallel to the annular sealing face of the one of said first sealing member or said second sealing member.

4. A mechanical seal according to claim 1, wherein the holding piece is arranged to releasably clamp the retaining rib to secure the one of said first sealing member or said second sealing member into position.

5. A mechanical seal according to claim 1, wherein the mount is in the form of a resilient ring that is fixed to the one of said first sealing member or said second sealing member.

6. A mechanical seal according to claim 1, wherein the one of said first sealing member or said second sealing member includes a recess in which the mount is fitted.

7. A mechanical seal according to claim 1, wherein the mount is formed from a viscoelastic material bonded to the one of said first sealing member or said second sealing member.

8. A mechanical seal according to claim 7, wherein the mount is bonded by a vulcanising process to the one of said first sealing member or said second sealing member.

9. A mechanical seal according to claim 1, wherein the one of said first sealing member or said second sealing member is formed from ceramic material.

10. A mechanical seal according to claim 1, wherein the mounting assembly mounts the first sealing member to the rotatable shaft.

11. A mechanical seal according to claim 1, further comprising a second mounting assembly arranged to secure the other of said first sealing member or said second sealing member in position relative to a second support structure of the mechanical seal, the second mounting assembly having a body secured to said other of the sealing members and a retaining rib that projects from the body of a second mount, and a second holding piece to clamp a free end of the retaining rib of the second mount by and between the second holding piece and the second support structure to allow the transfer of torque between the said other of the sealing members and the second support structure.

12. A seal assembly for a mechanical seal, the assembly comprising:
   a sealing member having an annular sealing face defining a central axis;
   a support structure; and
   a mounting assembly arranged to secure the sealing member to the support structure, the mounting assembly comprising,
      a mount bonded to the sealing member wherein the mount includes a body portion and a retaining rib that projects radially from the body portion beyond the sealing member, the retaining rib having a free end opposite the body that is spaced apart from and not in contact with the sealing member,
      a holding piece mounted to the support structure, the free end of the retaining rib being disposed between, and clamped in the same direction as the central axis by, the holding piece and the support structure; and
      an abutment surface located on the holding piece or the support structure against which the sealing member bears;
   wherein the sealing assembly is configured such that the transfer of torque between the sealing member and the support structure is accommodated through the clamped retaining rib, whereas axial movement of the sealing member is restrained by the sealing member bearing against the abutment surface.

13. A seal assembly according to claim 12, wherein the mount is formed from at least one resilient member bonded to the sealing member.

14. A seal assembly according to claim 13, wherein the mount is in the form of a resilient ring.

15. A seal assembly according claim 12, wherein the mount is formed from a viscoelastic material.

16. A seal assembly according to claim 12, wherein the rib projects in a plane that is substantially parallel to the sealing face of the sealing member.

17. A seal assembly according to claim 12, wherein the sealing member includes a recess in which the mount is fitted.

18. A seal assembly according to claim 12, wherein the sealing member is formed from ceramic material.

19. A pump including a pump casing having an aperture and a drive shaft that extends along a longitudinal axis through the aperture, the pump comprising:
   a mechanical seal comprising,
      opposed first and second sealing members, each having an annular sealing face surrounding a rotatable shaft, the first sealing member adapted to be sealed to the rotatable drive shaft and the second sealing member adapted to be sealed to a housing of the mechanical seal, the sealing faces being arranged to be urged into contact to form a seal therebetween,
      a mounting assembly arranged to secure one of said first or second sealing members in position relative to a support structure of the mechanical seal, the mounting assembly including a mount having a body secured to the one of said first sealing member or said second sealing member, and a retaining rib that projects radially from the body beyond the one of said first sealing member or said second sealing member, the retaining rib having a free end opposite the body that is spaced apart from and not in contact with the one of said first sealing member or said second sealing member,
      a holding piece mounted to the support structure, the free end of the retaining rib being disposed between, and clamped in the direction of the longitudinal axis by, the holding piece and the support structure, and
      an abutment surface located on the holding piece or the support structure against which the one of said first sealing member or said second sealing member bears,
      the mounting assembly being configured such that the transfer of torque between the one of said first sealing member or said second sealing member and the support structure is accommodated through the clamped retaining rib, whereas the one of said first sealing member or said second sealing member bears against the abutment surface so as to restrain axial movement of the one of said first sealing member or said second sealing member away from the other of said first sealing member or said second sealing member thereby providing a fluid seal between the casing and the drive shaft,
   wherein the rotatable shaft of the mechanical seal is mounted to the drive shaft and the housing of the mechanical seal is mounted to the pump casing.

20. A mechanical seal for sealing between a rotatable shaft defining a longitudinal axis and a housing, the mechanical seal comprising:
   opposed first and second seal assemblies, the first seal assembly adapted to be sealed to the rotatable shaft and the second seal assembly adapted to be sealed to the housing, each seal assembly comprising:
      a sealing member having an annular sealing face surrounding the shaft and arranged to be urged into contact to form a seal with the other sealing face, the sealing member secured in position relative to a support structure of the mechanical seal;
      a mount having a body secured to the sealing member, and a retaining rib that projects radially from the body beyond the sealing member;
      a holding piece mounted to the support structure, the free end of the retaining rib being disposed between, and clamped in the direction of the longitudinal axis by, the holding piece and the support structure; and
      an abutment surface against which the sealing member bears in contact therewith, the abutment surface being located on the support structure or holding piece;
   wherein the abutment surface located on the support structure or holding piece restrains axial movement of the sealing member relative to the retaining rib, and the retaining rib accommodates the transfer of torque between the sealing member and the support structure.

* * * * *